US006845840B2

(12) United States Patent
Cowan et al.

(10) Patent No.: US 6,845,840 B2
(45) Date of Patent: Jan. 25, 2005

(54) SURFACE MOUNTED LOUDSPEAKER AND BRACKET FOR THE MOUNTING THEREOF

(75) Inventors: Jeffrey N. Cowan, Manchester, NH (US); James Petronio, New York, NY (US); Michael Chamness, Gloucester, MA (US); Craig T. Haskell, South Berwick, ME (US)

(73) Assignee: Boston Acoustics, Inc., Peabody, MA (US)

( * ) Notice: Subject to any disclaimer, the term of this patent is extended or adjusted under 35 U.S.C. 154(b) by 64 days.

(21) Appl. No.: 09/925,570

(22) Filed: Aug. 9, 2001

(65) Prior Publication Data

US 2003/0029975 A1 Feb. 13, 2003

(51) Int. Cl.$^7$ .................................................. H05K 5/00
(52) U.S. Cl. ........................................ 181/150; 181/150
(58) Field of Search ................................ 181/148, 150, 181/151, 153, 155, 156; 248/220.1, 207

(56) References Cited

U.S. PATENT DOCUMENTS

| 4,602,761 A | * | 7/1986 | Carter ........................ 248/628 |
| 5,084,596 A | * | 1/1992 | Borsh et al. .................. 174/53 |
| 5,800,583 A | * | 9/1998 | Pippel et al. ................. 55/467 |
| 6,484,983 B1 | * | 11/2002 | Combest .................. 248/220.1 |

* cited by examiner

Primary Examiner—Kimberly Lockett
(74) Attorney, Agent, or Firm—Wolf, Greenfield & Sacks, P.C.

(57) ABSTRACT

A surface mounted loudspeaker is provided which, in conjunction with a mating brace which fits in a recessed form in the rear of the speaker enclosure, is mountable to a single wall in a variety of orientations, in corners with various orientations, and to a substantially horizontal surface in a variety of orientations with little if any additional hardware. In all orientations, the speaker provides good aesthetics, with the bracket being substantially invisible.

24 Claims, 7 Drawing Sheets

SURFACE MOUNTED LOUDSPEAKER AND BRACKET FOR THE MOUNTING THEREOF

FIELD OF THE INVENTION

This invention relates to loudspeakers and more particularly to a universal, surface-mounted loudspeaker having a mounting bracket and other components which facilitate the mounting or positioning of such loudspeaker on substantially any surface in a wide variety of orientations with good aesthetics.

BACKGROUND OF THE INVENTION

Audio systems generally employ at least two and, particularly for surround sound applications, four or more loudspeakers. The positioning of these loudspeakers, while to some extent being dictated by desired audio performance, is also dictated by available space at the site where the audio system is located and by aesthetics. While the latter two considerations sometimes result in the loudspeakers being flush mounted in for example a wall or ceiling, such mounting can be time consuming and expensive, significantly reduces the ability to reposition a loudspeaker if desired and can also result in heat management problems where the loudspeaker is in a confined space. Flush mounting of a loudspeaker in a wall or ceiling may also make it difficult to angle the loudspeaker for optimum sound quality and three-dimensional imaging.

However, in order to find space for the loudspeakers at the optimum locations for audio performance, particularly in surround sound applications, it is frequently necessary to mount the loudspeakers in corners, for example at the junction of two walls, at the junction of a wall and ceiling, at the junction of a wall and floor, or at a three-way junction where two walls and either a floor or a ceiling come together. Alternatively, it may be desired to mount a loudspeaker to a wall very close to either a ceiling, floor or adjacent wall. Space and aesthetics considerations may also dictate various orientations for a loudspeaker when mounted. It may also be desirable in some applications to merely stand the loudspeaker on a floor, piece of furniture, or other surface, the orientation of the loudspeaker when so positioned again being dictated by the required position and angle for optimum sound performance, by available space and by aesthetics.

While various prior art loudspeakers and loudspeaker mounting brackets have been available, most have been designed for use with the loudspeaker in only a single, or at most a limited number of, positions and/or orientations, and different hardware has sometimes been required where the loudspeaker is to be mountable in different positions and/or orientations. This either requires that the loudspeaker be packed with a variety of hardware to accommodate different potential mountings or that each loudspeaker be packaged for only a limited range of uses. The former increases the cost of each unit shipped and also increases the size and weight of the product shipped, and therefore shipping costs. The latter results in a requirement for stocking additional inventory and can result in inventory mismatch problems.

Much of the hardware currently used for surface mounting loudspeakers is also not well designed from an aesthetic standpoint, the brackets for example being substantially visible for the mounted loudspeaker, thus detracting from the overall aesthetics of the loudspeaker as mounted. A further potential problem is that many of the brackets require that the loudspeaker be slid or fitted into the bracket by being moved in a direction having a substantial component parallel to the mounting surface. This may limit the ability to mount the loudspeaker close to an adjacent ceiling, floor, or wall.

A final potential problem is that loudspeakers generally contain a name or logo plate of the manufacturer, which plate should have the same orientation on a mounted loudspeaker regardless of the loudspeaker orientation. This requires that the orientation of such a plate be easily changeable without otherwise affecting the aesthetics or functionality of the loudspeaker.

A need therefore exists for an improved surface mounted loudspeaker construction which permits the loudspeaker to be mounted in substantially any location and/or orientation, including close to ceilings, floors and walls, with only a single set of mounting hardware, which hardware is not substantially visible and does not detract from the aesthetics of the loudspeaker when the loudspeaker is mounted in any of its permitted locations and orientations. The design should also facilitate the placement of the loudspeaker on a surface, for example a horizontal surface such as a floor or furniture top, in a variety of orientations. Finally, regardless of the orientation of the loudspeaker, it should be possible to easily adjust any name or logo plate on the loudspeaker so that it is properly oriented for the particular loudspeaker orientation.

SUMMARY OF THE INVENTION

In accordance with the above, this invention provides a universal surface mounted loudspeaker which includes an enclosure in which loudspeaker components are mounted, a grill covering the enclosure and a bracket sized to fit substantially flush in a corresponding recess formed in a rear portion of the enclosure. The bracket includes features to facilitate attachment of the bracket to at least one surface and has at least one post positioned to extend through a corresponding hole in the rear portion of the enclosure, each post being adapted to co-act with a corresponding fastener to secure the enclosure to the bracket. The fastener may for example be a screw mating with corresponding internal threads in a corresponding post, each screw preferably being mated to the corresponding post with the grill removed from the enclosure so that the screws are not visible when the grill is covering the enclosure. For an illustrative embodiment, the enclosure is fitted to the bracket by moving the enclosure to the bracket in a direction having a component substantially perpendicular to each surface to which the bracket is mounted. The one or more posts preferably extend in the same direction, there being a plurality of posts, for example two, for preferred embodiments.

Where the loudspeaker is adapted to fit in a corner, the rear portion of the enclosure may have two truncated side walls at substantially a 90° angle to each other, with a flat back wall therebetween, the recess being formed in the back wall and both side walls. For this embodiment, the bracket could also have two truncated side walls at substantially a 90° angle to each other with a flat back wall therebetween, each wall of the bracket being sized to fit substantially flush in the portion of the recess formed in the corresponding wall of the enclosure. The features in the bracket can include at least one hole formed in each side wall of the bracket through which a suitable fastener may be passed to secure the bracket to each surface forming the corner. Where the loudspeaker is also adapted to be mounted to a flat surface, the features may also include at least two holes formed in the rear wall of the bracket through which a suitable fastener may be passed to secure the bracket to a flat surface and/or the features may include an opening in the rear wall of the bracket which is sized to fit over a wall outlet plate and a pair of holes positioned relative to the opening so that screws for the plate can pass through the holes to secure the bracket to the flat surface in which the plate is mounted.

A hole may also be provided in the grill and a symbol-containing plate having a post extending from the rear thereof may also be provided. The post is preferably sized to fit snugly in the hole so that the orientation of the plate is adjustable to maintain a consistent orientation for the symbol regardless of loudspeaker orientation.

A slot may also be formed in the rear portion of the enclosure near at least one end of the enclosure and a corner bracket may be provided having an extension which fits snugly in the slot, the corner bracket, when the loudspeaker is corner mounted, filling the space between the rear surface of the enclosure and the corner. A slot may be formed at each end of the enclosure and a corner bracket provided for each such slot. The corner to bracket may also have a foot on one side, the foot when facing the adjacent end of the enclosure facilitating the standing of the loudspeaker on such adjacent end.

The mounting bracket may also have an external web extending parallel a long side of the enclosure and a brace may be provided which is attachable to the web to support the loudspeaker in a desired position when standing on such long side. The brace may have a plurality of inner fingers which extend on one side of the web and a plurality of outer thumbs which extend on the opposite side of the web when the brace is attached to the web. The loudspeaker is in the shape of a one quarter cylinder for an illustrative embodiment.

The invention also includes a bracket for use with a surface mounted loudspeaker having an enclosure with a recess formed in a rear portion thereof, the bracket being sized to fit substantially flush in the recess and including at least one post positioned to extend through a corresponding hole in the rear portion of the enclosure, each post being adapted to coact with a corresponding fastener to secure the enclosure to the bracket, and a plurality of features which facilitate attachment of the bracket to surfaces forming a corner and/or a single flat surface. For an illustrative embodiment, each of the fasteners is a screw mating with corresponding internal threads in the corresponding post. For an illustrative embodiment, the bracket has two truncated side walls at substantially a 90° angle to each other with a flat back wall therebetween, each wall of the bracket being sized to fit substantially flush in the portion of the recess formed in a corresponding wall of the enclosure. The features may include at least one hole formed in each side wall of the bracket through which a suitable fastener may be passed to secure the bracket to each surface forming a corner, and may also include at least two holes formed in the rear wall of the bracket through which a suitable fastener may be passed to secure the bracket to a flat surface. Finally, the features may include an opening in the rear wall of the bracket which is sized to fit over a wall outlet plate and a pair of holes positioned relative to such openings so that screws for the plate can pass through the openings to secure the bracket to a flat surface in which the plate is mounted.

The foregoing and other objects, features and advantages of the invention will be apparent from the following more particular description of an illustrative embodiment of the invention as shown in the accompanying drawings, the same reference numeral being used for common elements in the various drawings.

DETAILED DESCRIPTION

Figure 1:
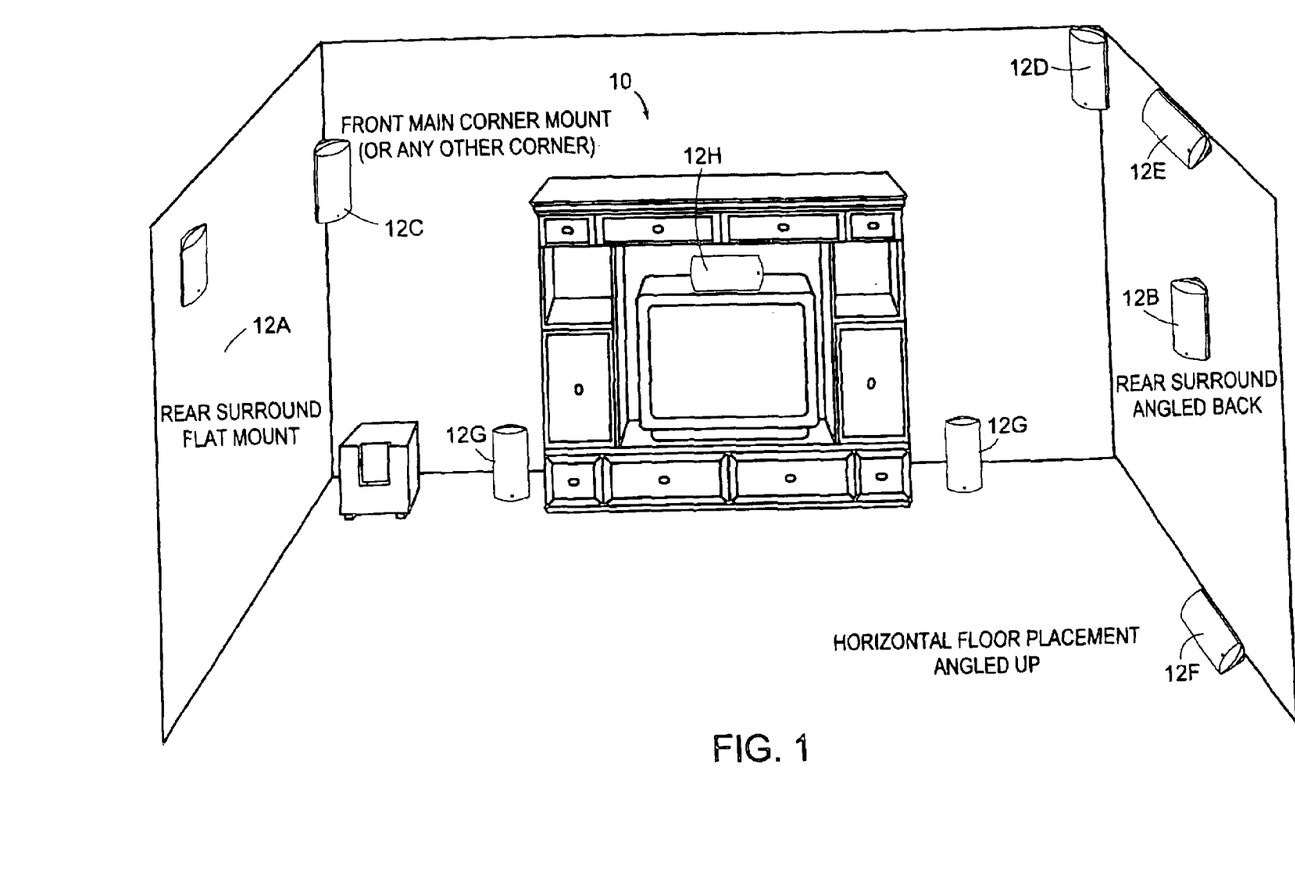
FIG. 1 is an illustration of a room showing various locations and orientations in which a speaker utilizing the teachings of this invention may be mounted.

FIG. 1 illustrates a room containing a multimedia system 10 which includes a plurality of satellite speakers 12 positioned and angled throughout the room to achieve selected audio effects. It should be noted that the speakers shown in FIG. 1 are positioned and oriented to illustrate options available utilizing the teachings of this invention rather than for purposes of achieving a particular audio effect, and thus, while the various orientations shown are desirable for, and would be used in, various systems, the speakers 12 would probably not be combined as shown in FIG. 1 in a single system. In particular, speaker 12A is shown as a rear surround speaker flat-mounted to a wall (i.e. oriented so as to project perpendicular to the wall). Speaker 12B is a similar rear surround speaker mounted so as to be angled toward the back of the room (i.e. in the direction of the observer). Speakers 12C and 12D are front main corner-mounted speakers, speaker 12D being mounted at the junction of the ceiling, front wall and right side wall, while speaker 12C is mounted lower, being only at the junction of the rear wall and left side wall. Speaker 12E is a horizontal, downwardly facing, rear surround speaker positioned at the junction of the ceiling and the right side wall, while speaker 12F is a horizontal, outwardly angled, rear surround speaker positioned at the junction of the floor and right side wall. Speakers 12G and 12H are surface-mounted speakers not attached to a wall, speakers 12G being vertically mounted on the floor and speaker 12H being horizontally flat-mounted on the top surface of the television. Heretofore, a single speaker with a single speaker mount has not been available for achieving all of the various mounting positions and orientations shown in FIG. 1, multiple different mounting brackets normally being required, and in particular, to the extent mounting brackets have permitted multiple orientations for a speaker, the brackets have been clearly visible in all or a substantial portion of the mounting positions, detracting from the overall aesthetics of the speaker. The speaker and mounting bracket arrangement of this invention permits a single speaker employing a single mounting bracket to be utilized to achieve all of the various positions and orientations shown in FIG. 1, while providing an aesthetically pleasing configuration with the bracket either invisible or substantially invisible for all orientations.

Figure 2A:
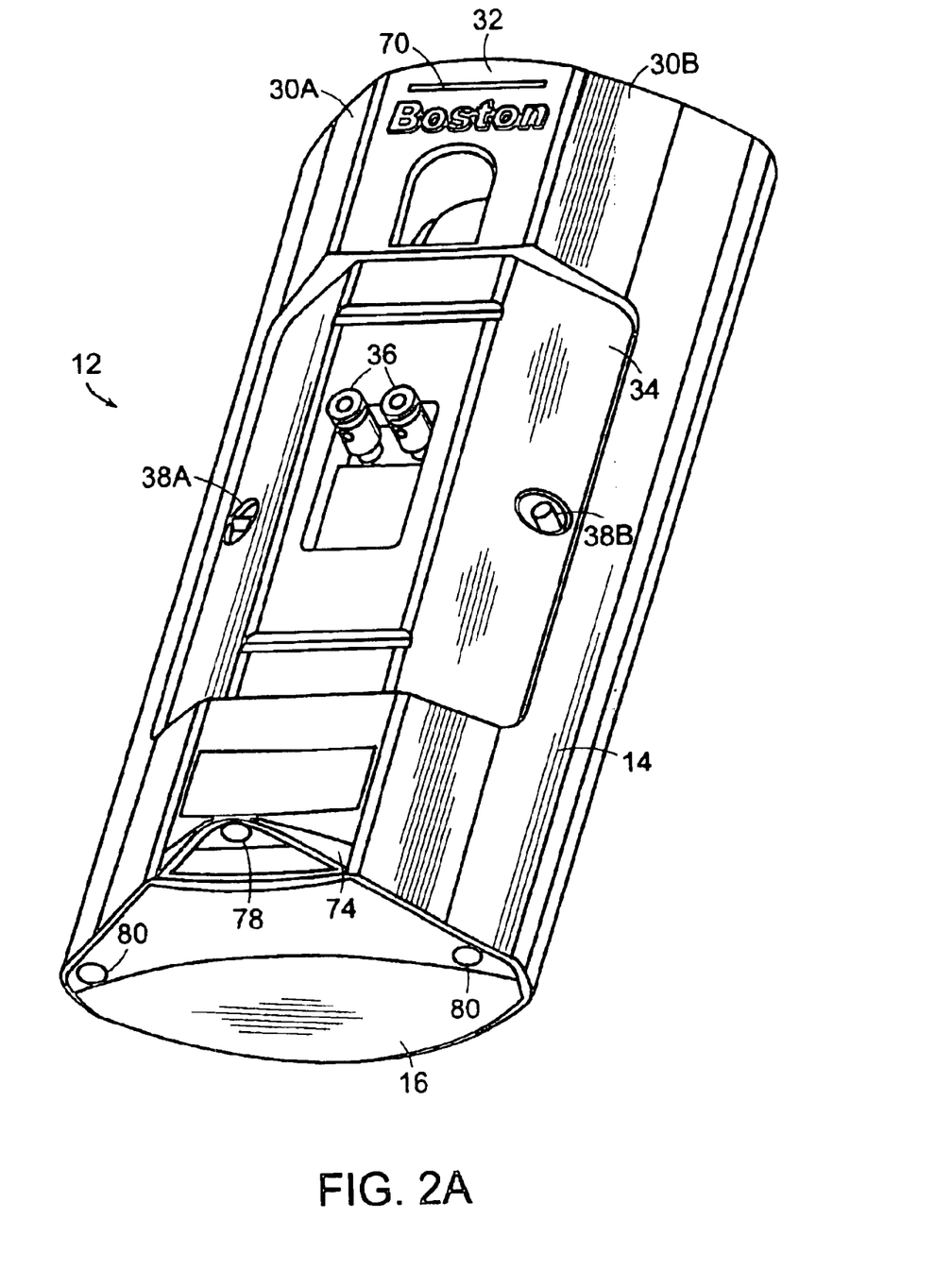
FIG. 2A is a back perspective view of a speaker of an illustrative embodiment without the mounting bracket and with a single corner filler or bracket turned to permit the speaker to stand vertically.
Figures 2B, 2C:
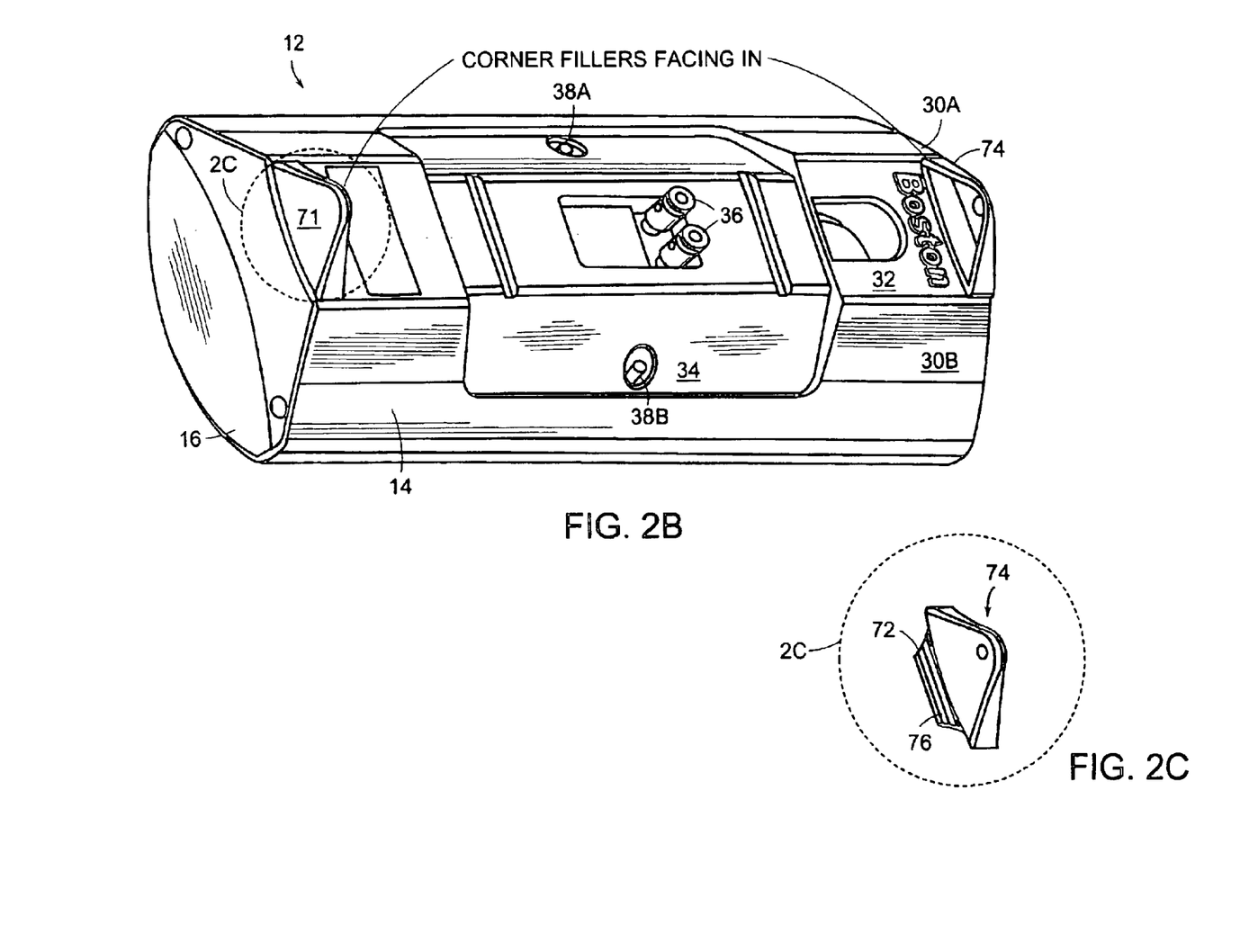
FIG. 2B is a rear perspective view of the illustrative speaker without the mounting bracket and with two corner brackets shown installed.
FIG. 2C is an exploded view of the corner bracket in FIG. 2B.
Figure 3:
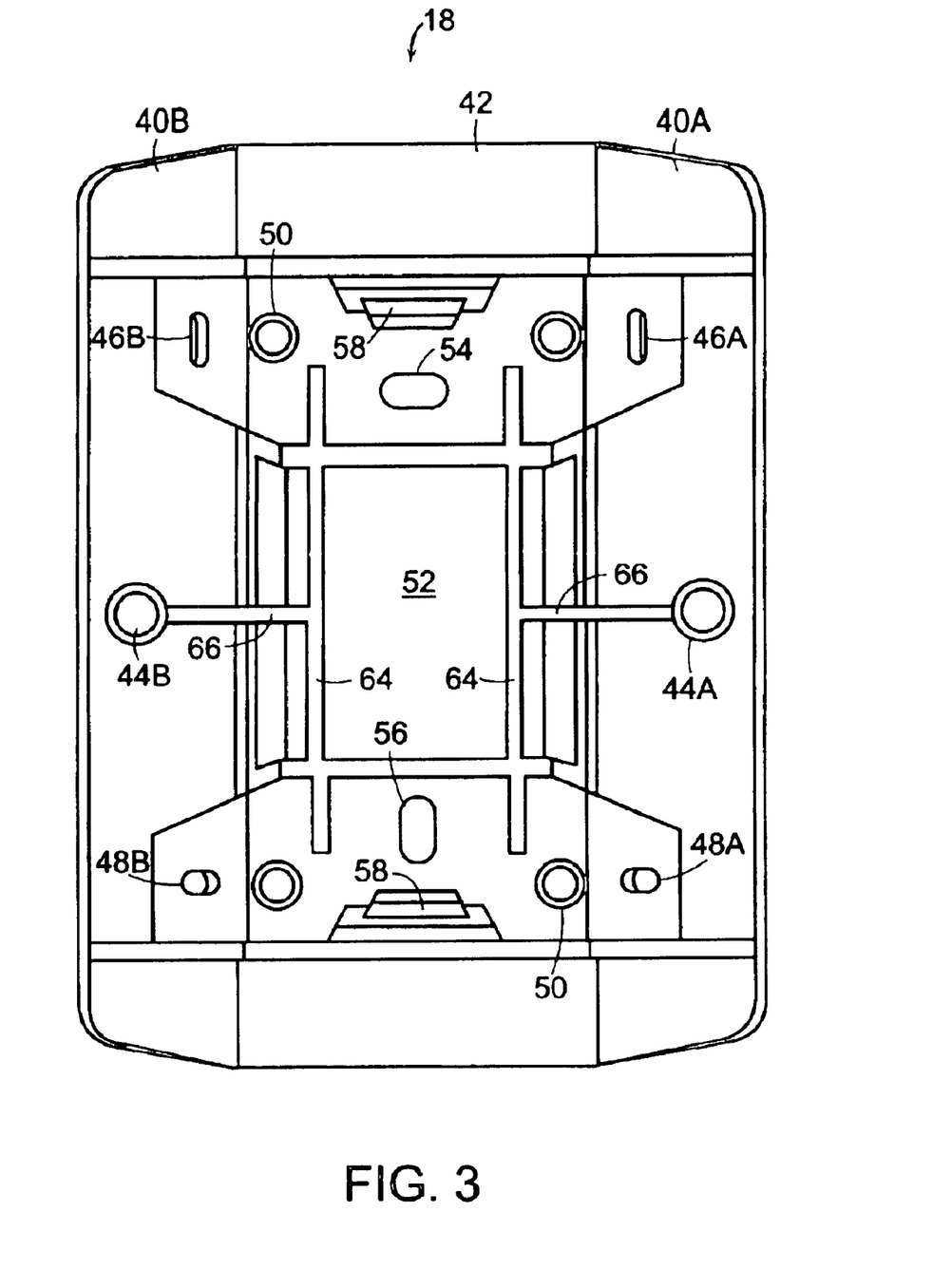
FIG. 3 is a front view of a mounting bracket suitable for use with the speaker of FIGS. 2A and 2B.
Figure 4:
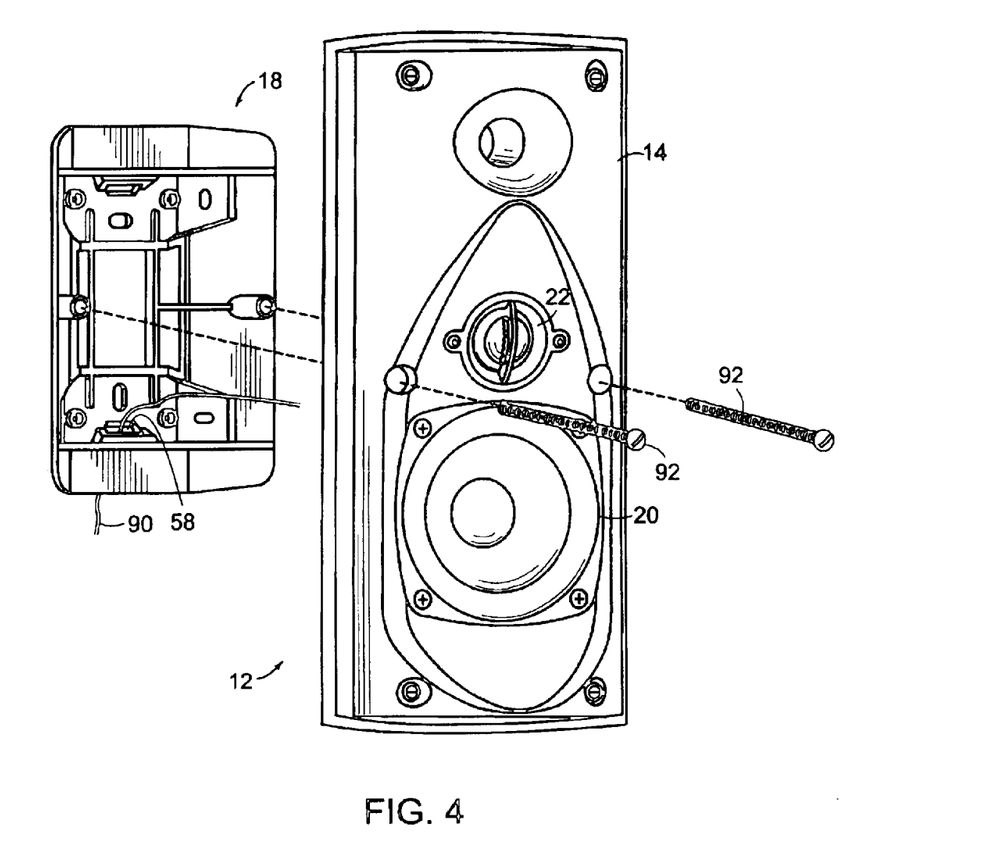
FIG. 4 is an exploded view illustrating a speaker without grill cover being mounted to a bracket.
Figure 5:
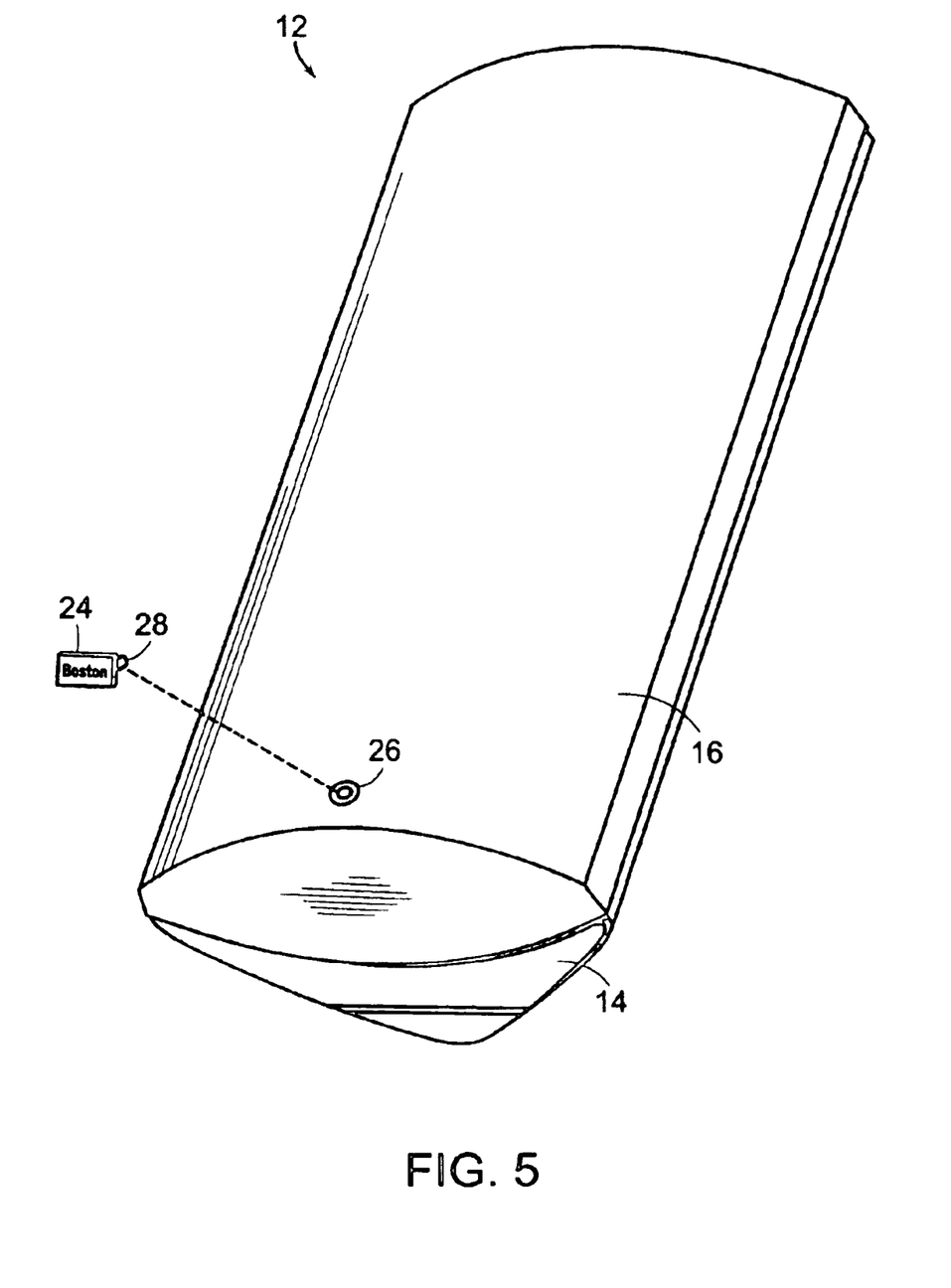
FIG. 5 is a front perspective view of the speaker including an exploded view of a rotatable name plate.

Referring to FIGS. 2A–5, it is seen that the speaker 12 of the illustrative embodiment is in the shape of a truncated one-quarter cylinder which facilitates corner mounting and includes a speaker enclosure 14 in which the various components of the speaker are mounted, a grill cover 16 and a mounting bracket 18. FIG. 4 shows the speaker enclosure 14 with the grill cover removed so that various components of the speaker, including base speaker 20 and tweeter 22, are visible. Since, as seen in FIG. 1, speaker 12 may be mounted horizontally or vertically, with any one of the four sides of the speaker being on top, and the opposite side on the bottom, and since it is desirable that name plate 24 (FIG. 5) be oriented so that the letters thereon are vertical regardless of the orientation of speaker 12, plate 24 must be mounted so as to be easily rotatable relative to the rest of the speaker. For the illustrative embodiment, this is accomplished by providing a hole 26 in grill cover 16 and a post 28 extending from the rear of plate 24 which post is sized to fit snugly in hole 26, the fit being such that there is sufficient friction between post 28 and the walls of hole 26 to maintain plate 24 in a desired orientation, but not so much friction as to prevent rotation of the post, and thus of plate 24, in hole 26 to the desired orientation of the plate for a given speaker mount orientation.

As may be best seen in FIGS. 2A and 2B, the rear of speaker enclosure 14 has a pair of truncated side walls 30A and 30B which are at substantially a 90° angle to each other to facilitate corner mounting, with a flat wall 32 extending therebetween. A recess 34 is formed in walls 30A, 30B and 32 of the enclosure, a pair of electrical connection posts 36 extending into the center portion of this recess. An opening 38A is formed through the recessed portion of wall 30A and an opening 38B is formed through the recessed portion of wall 30B.

Figure 6:
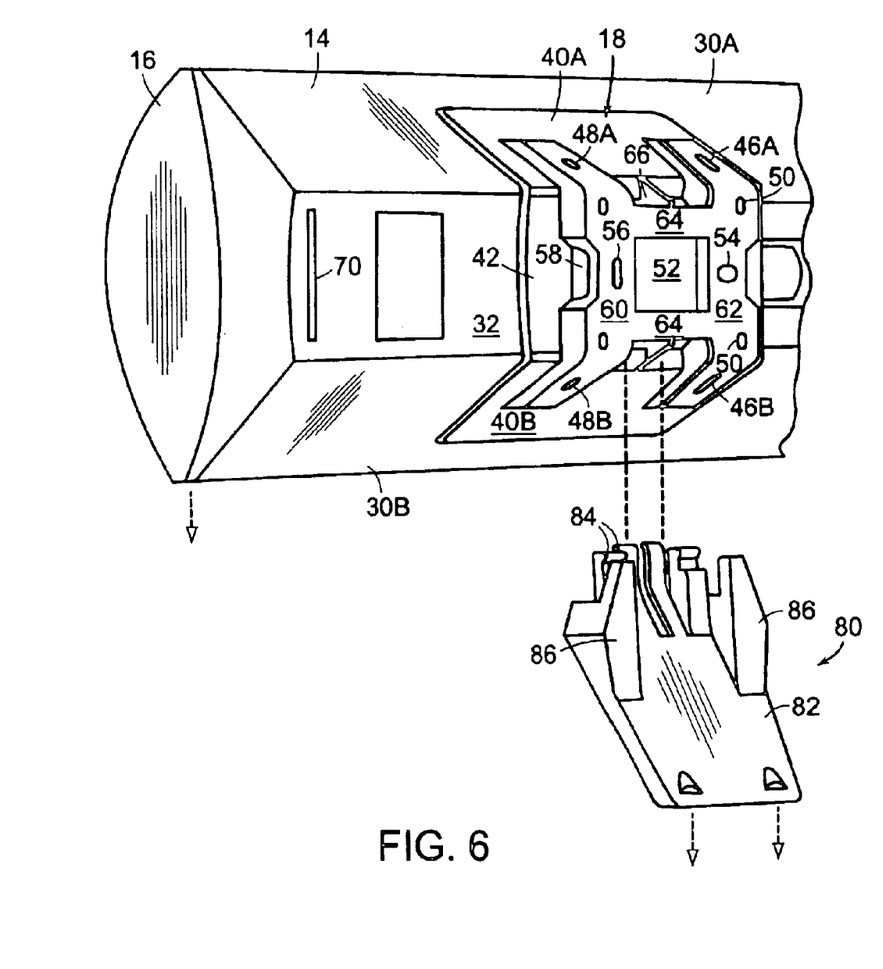
FIG. 6 is a partially cut-away partially exploded rear perspective view of the speaker shown in the previous figures with the mounting bracket attached thereto and also showing a brace attachable to webbing of the mounting bracket to support the speaker in a flat horizontal position.

Referring to FIG. 3, it is seen that bracket 18 also has a pair of truncated side walls 40A and 40B at substantially a 90° angle to each other connected by a back wall 42. Each side wall 40 has a corresponding mounting post 44A, 44B, the function of which will be described later. For an illustrative embodiment, each mounting post extends perpendicular to rear wall 42 and has an internally threaded metal stud secured in the post. Each wall 40A, 40B also has an elongated upper mounting hole 46A, 46B which is oriented vertically and a horizontally elongated mounting hole 48A, 48B. Rear wall 42 has four mounting holes 50, a rectangular opening 52, an upper, horizontally-elongated mounting hole 54, a lower, vertically-elongated mounting hole 56 and a pair of openings 58 through which, as will be discussed later, a speaker cable for attachment to posts 36 may pass. As may be best seen in FIG. 6, the back of bracket 18 has a raised portion in which all of the openings 46–58 are formed, portions 60 and 62 of the raised back being interconnected by a pair of webs 64 on opposite sides of hole 52, which webs are stiffened by corresponding braces 66, each brace 66 extending to corresponding post 44.

A slot 70 is formed in rear wall 32 of the enclosure near both the top and the bottom of the enclosure. Referring to FIGS. 2A and 2B, an extending tongue 72 of a corner or filler bracket 74 is adapted to fit in each of the slots 70 and has grooves 76 formed therein to increase friction between the tongue and slot so as to permit the bracket 74 to be removably retained in a slot 70. Brackets 74 may be utilized to perform two functions. First, as seen in FIG. 2A, when the speaker is to be vertically mounted as shown for the speakers 12G in FIG. 1, bracket 74 may be mounted in the bottom one of the slots 70 with an open side down to expose a self-adhesive rubber foot 78. This, in conjunction with self-adhesive rubber feet 80 mountable to the bottom of enclosure 14 support the speaker in the position shown for speakers 12G, and in particular prevent it from tipping over backwards.

When the speaker 12 is corner-mounted, as for the speakers 12C, 12D, 12E and 12F in FIG. 1, because rear side walls 30 resting adjacent the walls of the corner are truncated, there is a space between the back of the speaker and the wall. Filler brackets 74, mounted as shown in FIG. 2B to provide a smooth outer side, fill these spaces to provide a more pleasing aesthetic appearance.

In addition to being vertically mounted as shown for the speakers 12G, the speakers may also be surface mounted horizontally in at least three different ways. In particular, they may be mounted as shown for the speaker 12F where the speaker rests on one of its angled walls 30, and is angled slightly upward. Corner brackets 74 would typically be used when the speaker is mounted in this way both for a more pleasing aesthetic appearance and to provide additional support against tipping for the speaker when mounted in this position. The speaker may also be mounted on back wall 30 facing upward, a position not shown in FIG. 1, and may be flat-mounted facing forward as for the speaker 12H in FIG. 1. Since flat-mounting of the speaker cannot be achieved by resting the speaker on any of its rear walls, a brace 80 (FIG. 6) may be provided having a base 82, four inner fingers 84 which are adapted to fit on the inside of the bottom web 64 and two outer thumbs 86 which are adapted to fit on the outside of the web 64, the web being frictionally engaged between fingers 84 and thumbs 86 so as to removably attach brace 80 to the web, and thus to the speaker, to support the speaker in the front-facing position.

Bracket 18 can be attached to the wall or walls to which the speaker is to be mounted in a number of ways. If the speaker is to be mounted directly over an electrical outlet having wires extending therefrom for attachment to posts 36, opening 52 is designed to fit over the electrical outlet and openings 54 and 56 are positioned to align with the screw holes of the electrical outlet. The elongated shape of each of these openings permits any slight variation in the positioning of the outlet screws for a given outlet to be compensated for. Such a mounting would be a flat wall mount such as for the speaker 12A in FIG. 1. A flat wall mount may also be achieved by drilling holes in the wall adjacent each of the holes 50 and using for example screws passing through the holes 50 and molly bolts to secure the bracket to the wall. The bracket may be positioned vertically as shown in FIG. 3 for a vertical mounting of the speaker as shown for the speaker 12A or may be mounted horizontally (i.e. 90° to the position shown in FIG. 3) for a horizontal flat mount of the speaker.

Where the speaker is to be angle-mounted to a wall as for the speaker 12B, the appropriate side wall 40A or 40B of bracket 18 would be placed against the wall, appropriate holes drilled adjacent the corresponding holes 46 and 48 and, for example, screws and molly bolts used to mount the bracket to the wall. Again, this mounting could be vertical as shown for the speaker 12B or horizontal, and again, the slight elongation of the holes 46 and 48 compensates for any slight misalignment in the drilling of the holes in the wall for the mounting.

For a corner mounting, as for the speakers 12C, 12D, 12E and 12F, bracket 18 would be placed at the appropriate point in the corner and with the appropriate orientation, either horizontal or vertical, the holes 46 and 48 marked on both walls, appropriate holes drilled either with the bracket in place or removed, and the bracket then repositioned and secured to the wall in appropriate fashion, for example with screws and molly bolts.

Once this is done, as shown in FIG. 4, cable wire 90 can be fed in through the appropriate hole 58 in the bracket and attached to the electrical posts 36. Grill cover 18 would be removed from the speaker enclosure and the speaker enclosure moved straight back against posts 44 so that each post 44 passes through the corresponding hole 38 in the speaker enclosure and the walls of bracket 18 fit within recess 34, walls 40A, 40B and 42 of the bracket fitting respectively in the portions of the recess in walls 30A, 30B and 32 of the enclosure, so that very little if any of the bracket extends beyond the rear of the speaker enclosure. Once enclosure 14 has been properly fitted over bracket 18, screws 92 may be used to secure the enclosure to the bracket and the grill cover may then be remounted to the speaker. One advantage of the above mounting procedure is that, since the speaker enclosure is moved substantially perpendicular to the wall to which it is being mounted for purposes of mounting, the speaker can be mounted substantially flush against a floor or ceiling, as shown for example for the speaker 12D in FIG. 1, or against a wall for a horizontally mounted speaker. This is not possible for many prior art speakers which are slid into position on their brackets in a direction parallel to the wall to which they are being mounted.

While the invention has been shown and described above with respect to an illustrative preferred embodiment, this embodiment is being presented for purposes of illustration only, and it is apparent that many variations may be made therein. Thus, fasteners other than screws may be used for securing the enclosure to the bracket or, either done or in conjunction with molly bolts, for securing the bracket to the wall, and the number, positions and shape of the openings in bracket 18 may vary depending on application. The exact shape of the speaker, while ideal for the particular application, may also vary with application, and these changes may also affect the specific shape of the mounting bracket. Thus, while the invention has been particularly shown and described above with respect to an illustrative preferred embodiment, the foregoing and other changes in form and detail may be made therein by one skilled in the art while still remaining within the spirit and scope of the invention, which is to be defined only by the following claims:

What is claimed is:

1. A universal surface mounted loudspeaker including:

an enclosure in which loudspeaker components are mounted; and a bracket sized to fit substantially flush in a corresponding recess formed in a rear portion of said enclosure, wherein said recess is sized and shaped to receive the bracket directly, said bracket having features to facilitate attachment of said bracket to at least one surface and having at least one post positioned to extend through a corresponding hole in said portion of the enclosure, each said post being adapted to coact with a corresponding fastener secure the enclosure to the bracket.

2. A universal surface mounted loudspeaker including:

an enclosure in which loudspeaker components are mounted; and a bracket sized to fit substantially flush in a corresponding recess formed in a rear portion of said enclosure, said bracket having features to facilitate attachment of said bracket to at least one surface and having at least one post positioned to extend through a corresponding hole in said rear portion of the enclosure, each said post being adapted to coact with a corresponding fastener to secure the enclosure to the bracket;

a grill covering said enclosure, and wherein each said fastener is a screw mating with corresponding internal threads in the corresponding post, each screw being mated to the corresponding post with said grill removed from said enclosure, whereby said screws are not visible when said grill is covering said enclosure.

3. A loudspeaker as claimed in claim 2 wherein for said enclosure to be fitted to said bracket, said enclosure is moved to the bracket in a direction having component substantially perpendicular to each surface to which the bracket is mounted.

4. A loudspeaker as claimed in claim 3 wherein said at least one post extends in substantially said direction.

5. A loudspeaker as claimed in claim 1 wherein there are a plurality of said posts.

6. A loudspeaker as claimed in claim 5 wherein there are two of said posts.

7. A universal surface mounted loudspeaker including:

an enclosure in which loudspeaker components are mounted; and a bracket sized to fit substantially flush in a corresponding recess formed in a a rear portion of said enclosure, said bracket having features to facilitate attachment of said bracket to at least one surface and having at least one post positioned to extend through a corresponding hole in said rear portion of the enclosure, each said post being adapted to coact with a corresponding fastener to secure the enclosure to the bracket; and wherein said loudspeaker is adapted to fit in a corner, said rear portion of the enclosure having two truncated side walls at substantially a 90° angle to each other with a flat back well therebetween, said recess being formed in said back wall and both said side walls.

8. A loudspeaker as claimed in claim 7 wherein said bracket has two truncated side walls at substantially a 90° angle to each other with a flat back wall therebetween, each wall of the bracket being sized to fit substantially flush in the portion of the recess formed in a corresponding wall of the enclosure.

9. A loudspeaker as claimed in claim 8 wherein said features include at least one hole formed in each side wail of said bracket through which a suitable fastener may be passed to secure the bracket to each surface forming said corner.

10. A loudspeaker as claimed in claim 8 wherein said loudspeaker is also adapted to be mounted to a flat surface, and wherein said features include at least two holes formed in the rear wall of said bracket through which a suitable fastener may be passed to secure the bracket to a flat surface.

11. A loudspeaker as claimed in claim 8 wherein said loudspeaker is also adapted to be mounted to a flat surface, and wherein said features include an opening in the rear wall of said bracket which is sized to fit over a wall outlet plate and a pair of holes positioned relative to said opening so that screws for said plate can pass therethrough to secure the bracket to a flat surface in which said plate is mounted.

12. A universal surface mounted loudspeaker including:

an enclosure in which loudspeaker components are mounted; and a bracket sized to fit substantially flush in a corresponding recess formed in a rear portion of said enclosure, said bracket having features to facilitate attachment of said bracket to at least one surface and having at least one post positioned to extend through a corresponding hole in said rear portion of the enclosure, each said post being adapted to coact with a corresponding fastener to secure the enclosure to the bracket;

a grill covering said enclosure, a hole in said grill, and a symbol-containing plate having a post extending from the rear thereof, said post being sized to fit snugly in said hole, whereby the orientation of said plate is adjustable to maintain a consistent orientation for said symbol regardless of loudspeaker orientation.

13. A loudspeaker as claimed in claim 1 including a slot formed in said rear portion of the enclosure near at least one end of said enclosure, and a corner bracket having an extension which fits snugly in a said slot, said corner bracket, when said loudspeaker is corner mounted, filling the space between said rear surface and said corner.

14. A loudspeaker as claimed in claim 13 wherein there is a said slot formed at each end of said enclosure and a corner bracket for each said slot.

15. A loudspeaker as claimed in claim 13 wherein said corner bracket has a foot on one side thereof, said foot when facing the adjacent end of the enclosure facilitating the standing of the loudspeaker on said adjacent end.

16. A universal surface mounted loudspeaker including:

an enclosure in which loudspeaker components are mounted; and a bracket sized to fit substantially flush in a corresponding recess formed in a rear portion of said enclosure, said bracket having features to facilitate attachment of said bracket to at least one surface and having at least one post positioned to extend through a corresponding hole in said rear portion of the enclosure, each said post being adapted to coact with a corresponding fastener to secure the enclosure to the bracket;

wherein said bracket has an external web extending parallel to a long side of said enclosure, and including a brace attachable to said web to support said loudspeaker in a desired position when standing on a said long side.

17. A loudspeaker as claimed in claim 16 wherein said brace has a pair of inner fingers which extend on one side of said web and a pair of outer thumbs which extend on an opposite side of said web when said brace is attached to the web.

18. A universal surface mounted loudspeaker including:

an enclosure in which loudspeaker components are mounted; and a bracket sized to fit substantially flush in a corresponding recess formed in a rear portion of said enclosure, said bracket having features to facilitate attachment of said bracket to at least one surface and having at least one post positioned to extend through a corresponding hole in said rear portion of the enclosure, each said post being adapted to coact with a corresponding fastener to secure the enclosure to the bracket; and wherein said loudspeaker is in the shape of a one-quarter cylinder.

19. A bracket for use with a surface mounted loudspeaker having an enclosure with a recess formed in a rear portion thereof, wherein said recess is sized and shaped to receive the bracket directly, said bracket being sized to fit substantially flush in said recess, and including at least one post positioned to extend through a corresponding hole in said rear portion of the enclosure, with a corresponding fastener to secure the enclosure to the bracket, and a plurality of features which facilitate attachment of said bracket to both two surfaces forming a corner and a single flat surface, attachment being possible to either.

20. A bracket as claimed in claim 19 wherein each said fastener is a screw mating with corresponding internal threads in the corresponding post.

21. A bracket as claimed in claim 19 wherein said bracket has two truncated side walls at substantially a 90° angle to each other with a flat back wall therebetween, each wall of the bracket being sized to fit substantially flush in the portion of the recess formed in a corresponding wall of the enclosure.

22. A bracket as claimed in claim 21 wherein said features include at least one hole formed in each side wall of said bracket through which a suitable fastener may be passed to secure the bracket to each surface forming said corner.

23. A bracket as claimed in claim 21 wherein said features include at least two holes formed in the rear wall of said bracket through which a suitable fastener may be passed to secure the bracket to a flat surface.

24. A bracket as claimed in claim 21 wherein said features include an opening in the rear wall of said bracket which is sized to fit over a wall outlet plate and a pair of holes positioned relative to said opening so that screws for said plate can pass therethrough to secure the bracket to a flat surface in which said plate is mounted.

\* \* \* \* \*